(12) United States Patent
Spiecha et al.

(10) Patent No.: US 12,077,098 B1
(45) Date of Patent: Sep. 3, 2024

(54) AUXILIARY LIGHTING ENCLOSURE FOR VEHICLES

(71) Applicants: Brian Matthew Spiecha, Eads, TN (US); Tucker William Spiecha, Eads, TN (US); Tanner August Spiecha, Eads, TN (US)

(72) Inventors: Brian Matthew Spiecha, Eads, TN (US); Tucker William Spiecha, Eads, TN (US); Tanner August Spiecha, Eads, TN (US)

( * ) Notice: Subject to any disclaimer, the term of this patent is extended or adjusted under 35 U.S.C. 154(b) by 0 days.

(21) Appl. No.: 18/339,339

(22) Filed: Jun. 22, 2023

Related U.S. Application Data

(63) Continuation of application No. 18/318,834, filed on May 17, 2023, now abandoned.

(60) Provisional application No. 63/364,915, filed on May 18, 2022.

(51) Int. Cl.
*B60Q 1/30* (2006.01)

(52) U.S. Cl.
CPC .................................. *B60Q 1/3015* (2022.05)

(58) Field of Classification Search
CPC ......... B60Q 1/3015; B60Q 1/30; B60Q 1/305
See application file for complete search history.

(56) References Cited

U.S. PATENT DOCUMENTS

| | | | |
|---|---|---|---|
| 5,258,893 A | 11/1993 | Finneyfrock | |
| 5,364,142 A | 11/1994 | Coiner | |
| 5,688,036 A | 11/1997 | Marshall et al. | |
| 5,833,283 A * | 11/1998 | Shaw | B60R 19/50 293/121 |
| 6,140,919 A * | 10/2000 | Buchanan | B60Q 1/26 340/475 |
| 6,409,367 B1 | 6/2002 | Pratt | |
| 6,463,686 B1 * | 10/2002 | Eisenbraun | B60D 1/60 280/507 |
| 6,655,822 B1 | 12/2003 | Sylvester | |
| 7,008,088 B2 | 3/2006 | Pisciotti | |
| 7,347,597 B2 * | 3/2008 | French | B60D 1/62 362/540 |
| 7,387,414 B2 | 6/2008 | Helms | |
| 7,631,845 B2 | 12/2009 | Shafer | |
| 8,011,704 B2 | 9/2011 | Nees et al. | |
| 8,322,899 B1 * | 12/2012 | Rosario | B60Q 7/02 362/540 |
| 8,714,792 B2 | 5/2014 | Adams | |
| 10,159,238 B2 | 12/2018 | Cumpian, Jr. | |
| 10,755,613 B2 | 8/2020 | Brubaker | |
| 11,041,610 B1 | 6/2021 | Smith | |

(Continued)

*Primary Examiner* — Julie A Bannan
(74) *Attorney, Agent, or Firm* — Dunlap Bennett & Ludwig, PLLC

(57) ABSTRACT

A method, device, and system embodying an auxiliary light assembly for providing auxiliary rear lighting for vehicles having standard hitches. The auxiliary light assembly may include an enclosure adapted to operatively associate with, by way of a hitch tab, the hitch receiver of a standard hitch so that the auxiliary light assembly can be attached to the vehicle without altering the vehicle. Adjacent to the hitch tab a mounting tab may be provided along the exterior of the main body of the auxiliary light assembly. The enclosure encapsulates one or more lighting units, thereby protecting them from debris and mud as well as forming a secure connection between the one or more lighting units and the standard hitch.

5 Claims, 8 Drawing Sheets

(56) References Cited

U.S. PATENT DOCUMENTS

| | | |
|---|---|---|
| 11,433,837 B1 | 9/2022 | Rodgers et al. |
| 2008/0224843 A1 | 9/2008 | Overline |
| 2009/0251908 A1 | 10/2009 | Czuhanich et al. |
| 2014/0198510 A1 | 7/2014 | Law et al. |
| 2015/0203025 A1 | 7/2015 | Harmon |
| 2016/0347247 A1 | 12/2016 | Espey et al. |

* cited by examiner

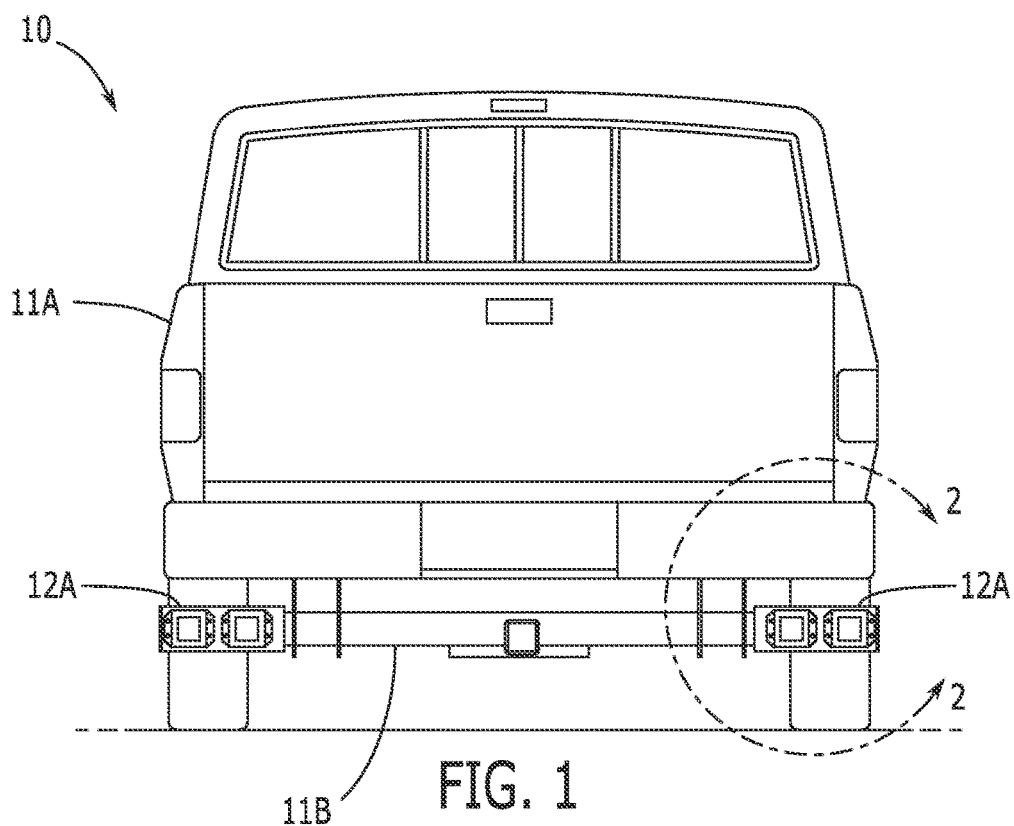
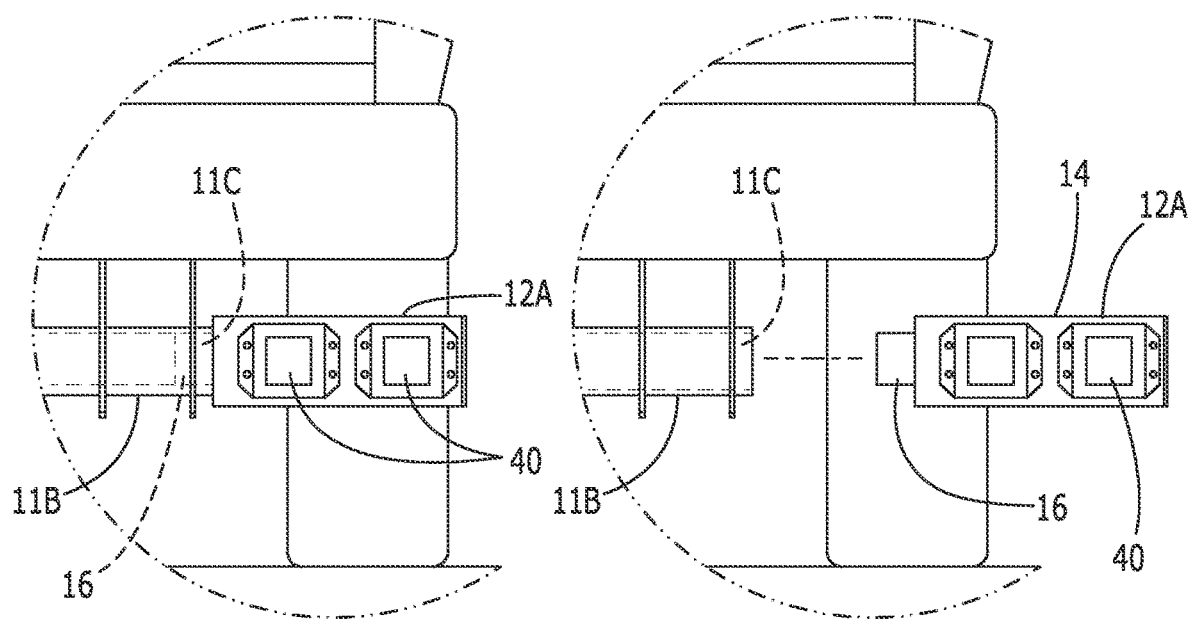
FIG. 1
FIG. 2
FIG. 3

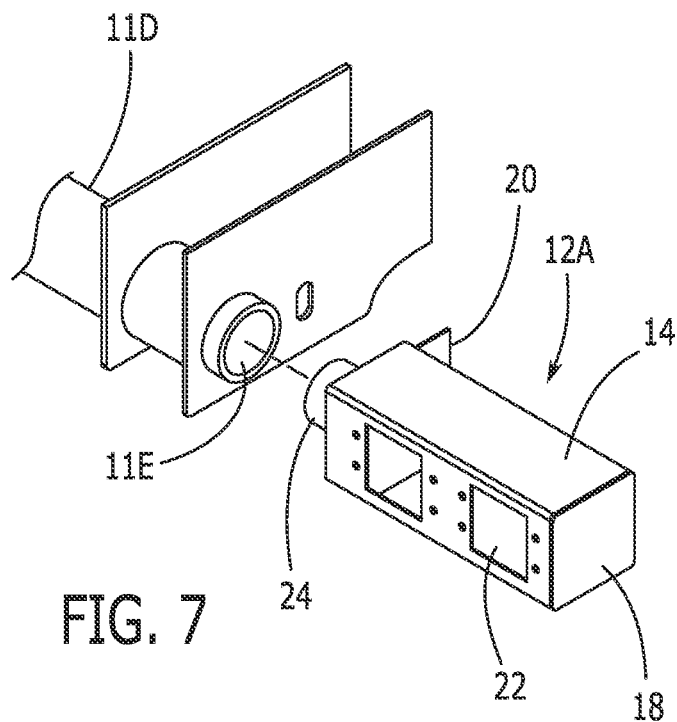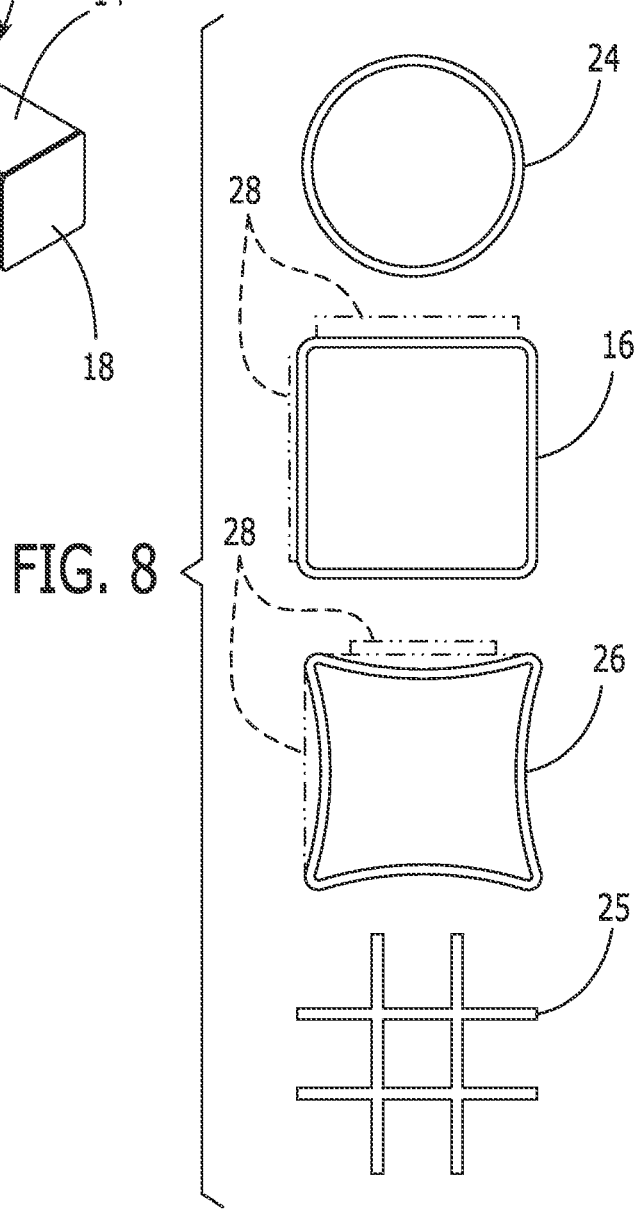

AUXILIARY LIGHTING ENCLOSURE FOR VEHICLES

CROSS-REFERENCE TO RELATED APPLICATION

This application claims the benefit of priority of U.S. provisional application No. 63/364,915, filed May 18, 2022, and the benefit of priority of U.S. non-provisional application Ser. No. 18/318,834, filed May 17, 2022, as a Continuation thereof, the contents of both are herein incorporated by reference.

BACKGROUND OF THE INVENTION

The present invention relates to auxiliary lighting enclosures and, more particularly, to an auxiliary lighting enclosure for vehicles.

Presently, auxiliary lighting is difficult to add to the back of certain vehicles, especially trucks, without physically altering the vehicle; for instance, current auxiliary lighting options require bolts or holes to be cut in a bumper or hitch. These physical alterations lessen the value of the vehicle as well as promote rust to form along the uncoated holes and cut sections.

There are other, alternative options that insecurely dangle the lights from the bumper or hitch and are generally considered aesthetically unpleasing. Moreover, other devices on the market do not encapsulate the lighting to prevent mud and debris from hitting the lighting. Thus, these other devices are vulnerable to daily driving hazards on the road and offroad.

As can be seen, there is a need for a device that can be easily installed on a vehicle without altering the vehicle and that results in a sturdy and secure attachment that also encapsulates the additional auxiliary lights.

SUMMARY OF THE INVENTION

In one aspect of the present invention, an auxiliary light assembly for a vehicle with a hitch receiver, the auxiliary light assembly includes the following: an enclosure extending between a proximal end and a distal end; a hitch tab extending from the proximal end in a parallel orientation with the enclosure, wherein the hitch tab is dimensioned and shaped such that the hitch tab fills a gap defined by a receiver opening of the hitch receiver without physically altering the hitch receiver or its associated hitch; at least one cutout formed along a longitudinal side of the enclosure; and an auxiliary light encapsulated in each cutout.

In another aspect of the present invention, the auxiliary light assembly further includes an endcap along the distal end, an end auxiliary light along the distal end, wherein the end auxiliary light is oriented approximately perpendicular to the other one or more auxiliary lights, or a reflector along the distal end, and wherein the enclosure is elongated along a longitudinal axis, and wherein the longitudinal axis is parallel with a longitudinal axis of the hitch receiver and the axle of the vehicle.

In another aspect of the present invention, the auxiliary light assembly further includes a mounting tab attached to an exterior surface of the enclosure adjacent to the proximal end.

In yet another aspect of the present invention, an auxiliary light system for a vehicle with a hitch receiver, the auxiliary light system including the following: a saddle-shaped assembly: defined in part by two inclined walls, each inclined wall inward of a distal end; the distal end providing an enclosure; at least one cutout formed along a longitudinal side of the enclosure; and extending proximally from each inclined wall, are wing posts; and a receiver wing attached on each of two opposing sides of a hitch receiver, wherein the receiver wing is dimensioned and shaped to slidably receive a respective wing post, wherein the saddle-shaped assembly is oriented approximately perpendicular relative to the hitch receiver, wherein one or more auxiliary lights are encapsulated in each distal end; and further including an end auxiliary light along the distal end so as to be oriented approximately perpendicular to the one or more auxiliary lights.

These and other features, aspects and advantages of the present invention will become better understood with reference to the following drawings, description, and claims.

BRIEF DESCRIPTION OF THE DRAWINGS

FIG. 1 is an elevation view of an exemplary embodiment of the present invention, shown in use for adding lights to a vehicle.

FIG. 2 is an enlarged detailed elevation view of FIG. 1.

FIG. 3 is an enlarged detailed exploded elevation view of FIG. 1,

FIG. 7 is an exploded top perspective view of an exemplary embodiment of the present invention.

FIG. 8 is an elevation view of exemplary embodiments of hitch tabs of the present invention.

DETAILED DESCRIPTION OF THE INVENTION

Figure 4:
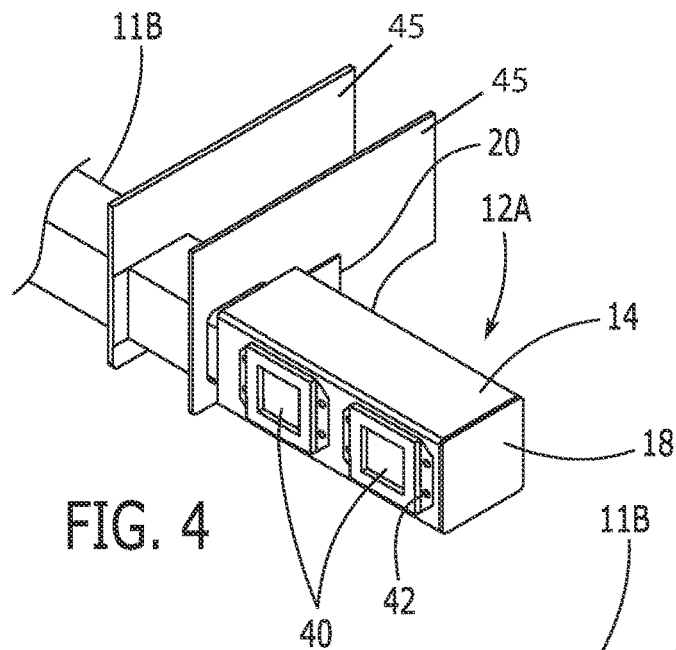
FIG. 4 is a top front perspective view of an exemplary embodiment of the present invention.
Figure 5:
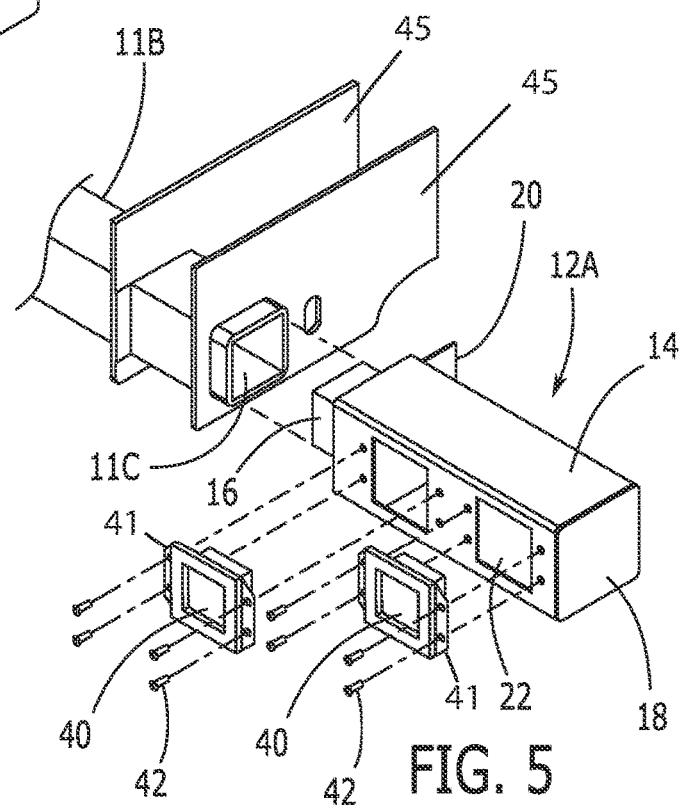
FIG. 5 is an exploded top perspective view of an exemplary embodiment of the present invention.
Figure 6:
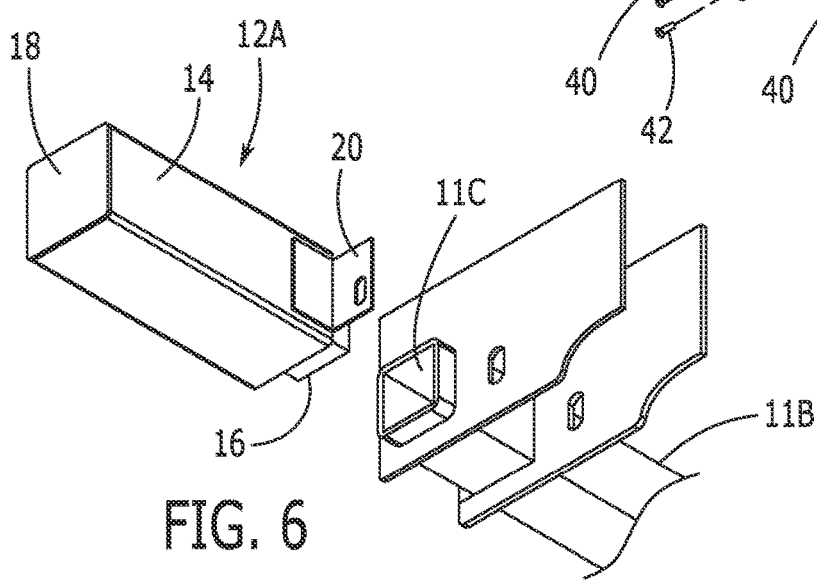
FIG. 6 is an exploded bottom perspective view of an exemplary embodiment of the present invention.
Figure 9:
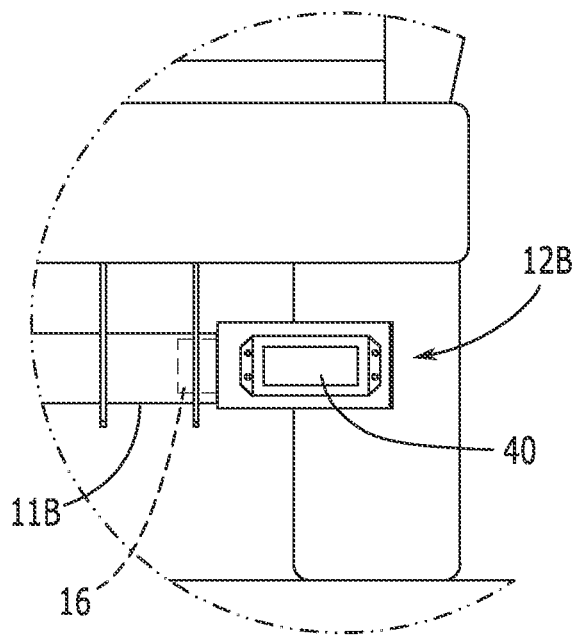
FIG. 9 is an enlarged detail elevation view of exemplary embodiment of the present invention, shown in use.
Figure 10:
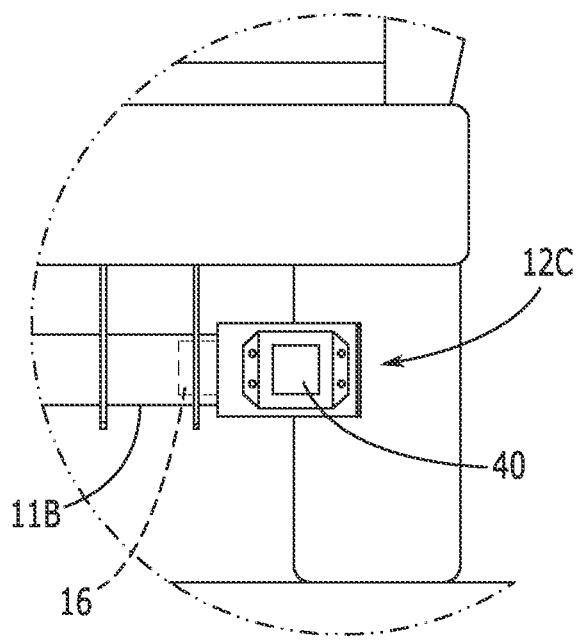
FIG. 10 is an enlarged detail elevation view of exemplary embodiment of the present invention, shown in use.
Figure 11:
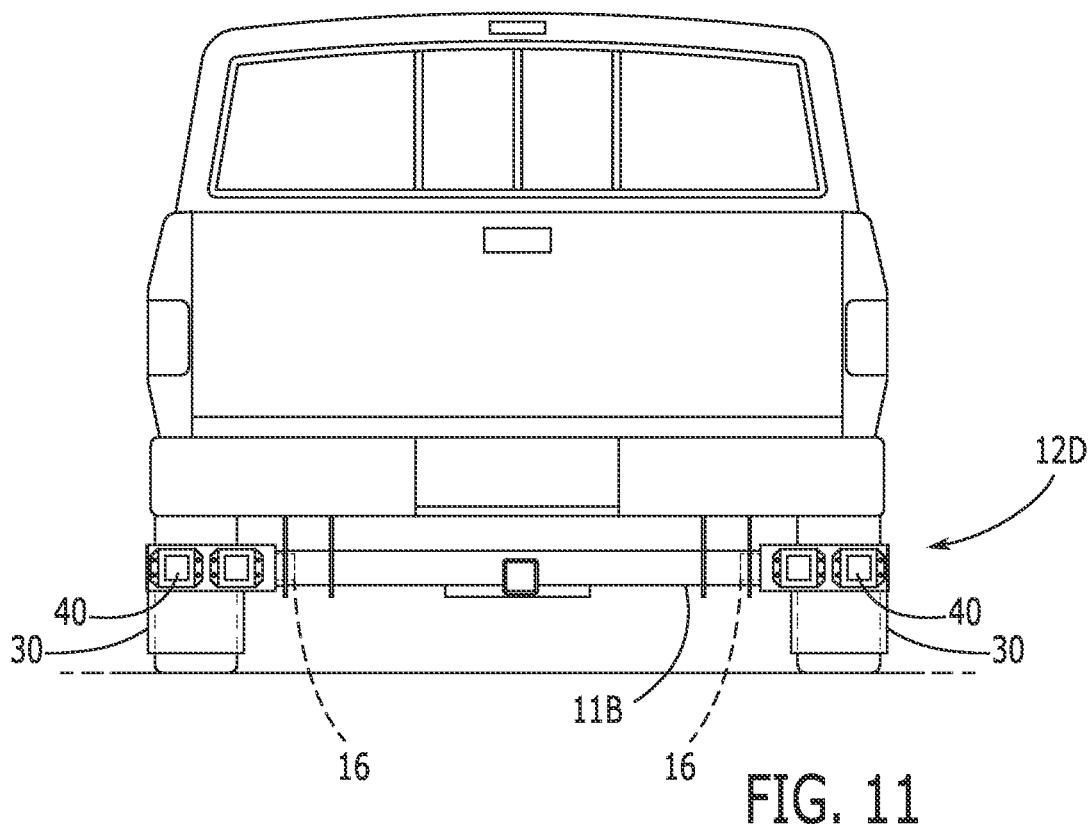
FIG. 11 is an enlarged detail elevation view of exemplary embodiment of the present invention, shown in use.
Figure 12:
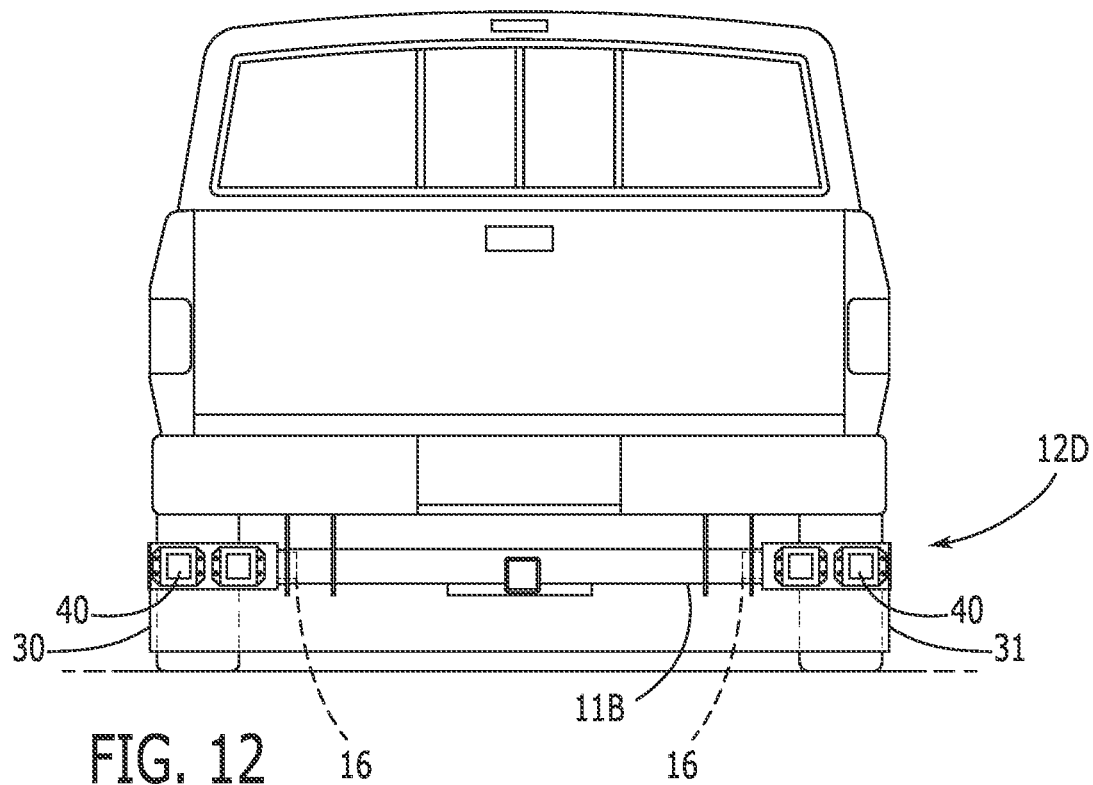
FIG. 12 is a top front perspective view of an exemplary embodiment of the present invention.
Figure 13:
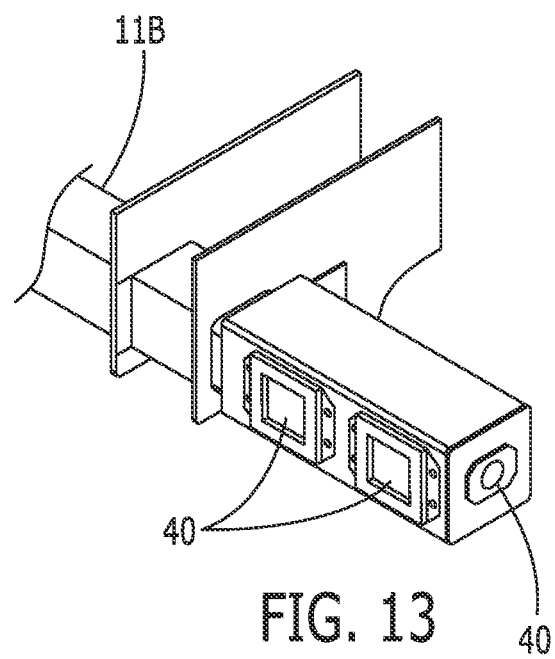
FIG. 13 is a top front perspective view of an exemplary embodiment of the present invention.
Figure 14:
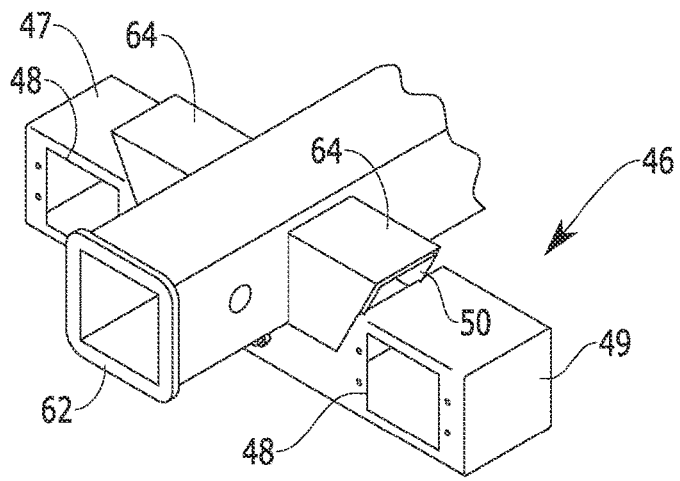
FIG. 14 is a top front perspective view of an exemplary embodiment of the present invention, shown in use installed to a hitch 62.
Figure 15:
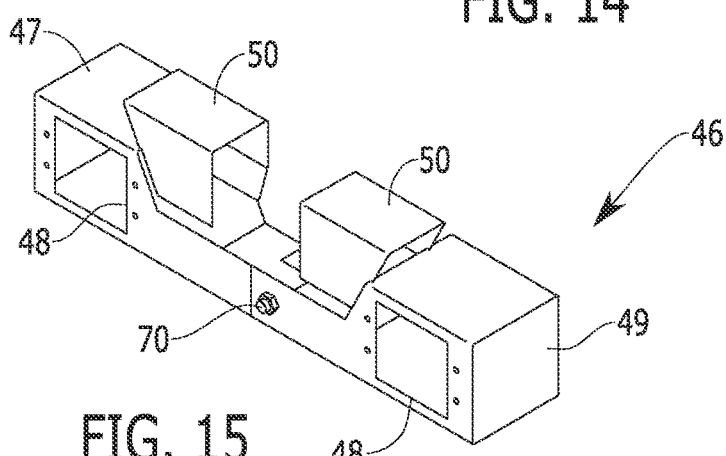
FIG. 15 is a top front perspective view of an exemplary embodiment of the present invention.
Figure 16:
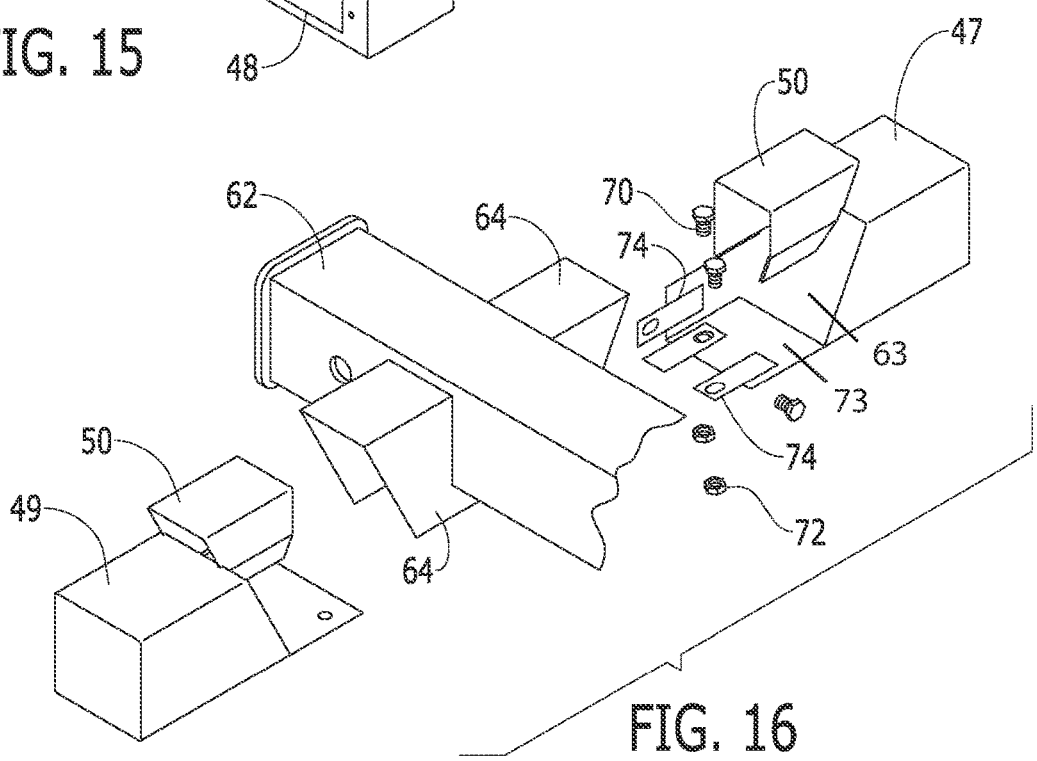
FIG. 16 is a top rear perspective view of an exemplary embodiment of the present invention, shown in use installed to the hitch 62.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides an aftermarket mounting option for rear backup and/or utility lights on a vehicle such as the F-250, F-350, and F-450 series trucks. Other embodiments contemplate other vehicles, manufacturers, and hitch assemblies.

The present invention provides a method, device, and system for providing auxiliary rear lighting for certain vehicles having standard as well as alternative hitches. Such rear lighting enables greater visibility at night or in low light areas at the flip of a switch. The additional rear lighting increases the visibility from the vehicle when reversing as well as improves visibility of the vehicle for bystanders and other vehicles.

The present invention encapsulates light units to prevent mud and debris from blocking the lights and to prevent potential breakage of the lights. The enclosure embodied in the present invention also enables utility lighting while the vehicle is parked. Advantageously, the present invention may be attached to the vehicle without having to physically alter the vehicle. In short, the present invention forms a sturdy, reinforced enclosure to protect the lighting without altering the vehicle.

The present invention may include an auxiliary lighting assembly 10 for a vehicle 11A with one of many standard tube hitches 11B, 11D, wherein the vehicle 11A has a tube hitch 11B or 11D extending laterally for each of the opposing two lateral sides of the hitch receiver, and wherein the auxiliary lighting assembly 10 is dimensioned and shaped to attach to a tube hitch receiver 11C, 11E, respectively, of the tube hitch 11B, 11D without altering said tube 11B, 11D or vehicle 11A.

The auxiliary lighting assembly 10 provides an enclosure 12A, 12B, 12C, or 12D for encapsulating one or more auxiliary lights 40. The main body 14 of each enclosure 12A, 12B, 12C, or 12D may provide a cutout 22 for each of the one or more auxiliary lights 40. The cutout 22 may be dimensioned and adapted to receive a housing for the auxiliary light 40. Laterally disposed flanges 41 along the auxiliary light housing periphery may be engaged by fasteners 42 to connect the flanges 41 to the exterior surface of the main body 14.

A proximal end of each enclosure 12A, 12B, 12C, or 12D provides a hitch tab 16, 24, 25, or 26 for being slidably received in the tube hitch receiver 11C, 11E of the respective tube hitch 11B, 11D. One or more shims 28 may be used to form a snug fit between mating parts (the interior of the tube hitch receiver 11C, 11E and the exterior of the hitch tab 16, 24, 25, 26). A radially extending mounting tab 20 may be provided along the main body 14, adjacent to the hitch tab 16, 24, 25, or 26, for facilitating connecting the auxiliary lighting device 10 to the tube hitch 11B, 11D. In some embodiments, one or more hitch wings 45 may radially extend from the tube hitch 11B, 11D, adjacent to its respective tube hitch receiver 11C,11E so that the mounting tab 20 and an adjacent hitch wing 45 can be mated, possibly by respective fastener holes 21 and 51. In some embodiments, the mounting tab 20 may be an angle welded to the exterior surface of the main body 14 of the enclosure 12A, 12B, 12C, or 12D.

A distal end of each enclosure 12A, 12B, 12C, or 12D may provide an end cap 18. In some embodiments, the distal end may provide an auxiliary light 40, oriented perpendicular relative to the other auxiliary light(s) 40. In yet other embodiments, the distal end may provide a reflector.

Along an exterior surface of the main body 14, opposite the exterior surface housing the one or more auxiliary lights 40, a mud flap 30 may depend therefrom.

In certain embodiments, the main body 14 may be a 4-inch square tube with a 2.5-inch square tube as the hitch tab 16 welded to the former's proximal end. In one embodiment, the hitch tab 16 may be welded to an inside corner of the 4-inch square tube, yet in other embodiments the 4-inch square tube and the 2.5-inch square tube may be colinear. Approximately four inches of the 2.5-inch square tube may protrude out of the 4-inch square tube. A 4"×4" steel plate operates as an end cap 18 to the opposite end of the welded-on 2.5-inch square tube on the 4-inch square tube.

An L-shaped plate may be welded on the side of the 2.5-inch square tube protruding out of the 4-inch tube, to form an end plate. A 2-inch piece of angle iron/mounting tab 20 may be welded to the backside of the 4-inch square tube, positioned approximately one inch off the side of the 2.5-inch square tube. On the face of the 4-inch square tube, eight holes may be drilled, and two squares may be cut centered with equal spacing apart to accept two auxiliary lights 40, respectively. This process is repeated on the other light assembly. At least one auxiliary light 40 may be included in the assembly. The present invention may slide into an existing tube hitch 11B on vehicle 11A. A nut and bolt may be added, and the lights 40 are ready for use.

The present invention may slide into a tube which is part of the hitch assembly of vehicle 11A. A nut and bolt may be used to secure the device to the hitch assembly. The present invention slides directly into the ends of the cross member of a hitch receiver, then it is bolted with a bolt on both ends to the main hitch assembly and wired into factory switches or reverse harnesses to give you a factory-looking auxiliary lighting option that is bolt-on without having to cut or alter your vehicle.

In some embodiments, the present invention could be made with a bent 2.5-inch square tube for other vehicle applications. It also could be made from a five-inch square tube or made as a single light housing.

Referring to FIGS. 14 through 20, the present invention may include a hitch receiver 46 for a hitch 62. A hollow hitch wing 64 may be attached to each opposing side of the hitch 62, bookending that portion of the hitch 62. The hitch receiver 46 may have two receiver halves 47 and 49, wherein each half has a rectangular distal end (providing a cutout 48 for mounting an auxiliary light housing) that has an upper edge that tapers downward as it extends proximally toward the other receiver half, thereby defining a saddle upon which the hitch 62 is seated or at least affords space for a lower portion of a connector of the hitch wings 64. The proximal ends 73 may be connected by fasteners 70, 72, 74.

The tapering wall 63 that defines each receiver half's above-mentioned tapering edge may provide a wing post 50 dimensioned and shaped to snugly slide into a hollow of a respective hollow hitch wing 64.

Figure 17:
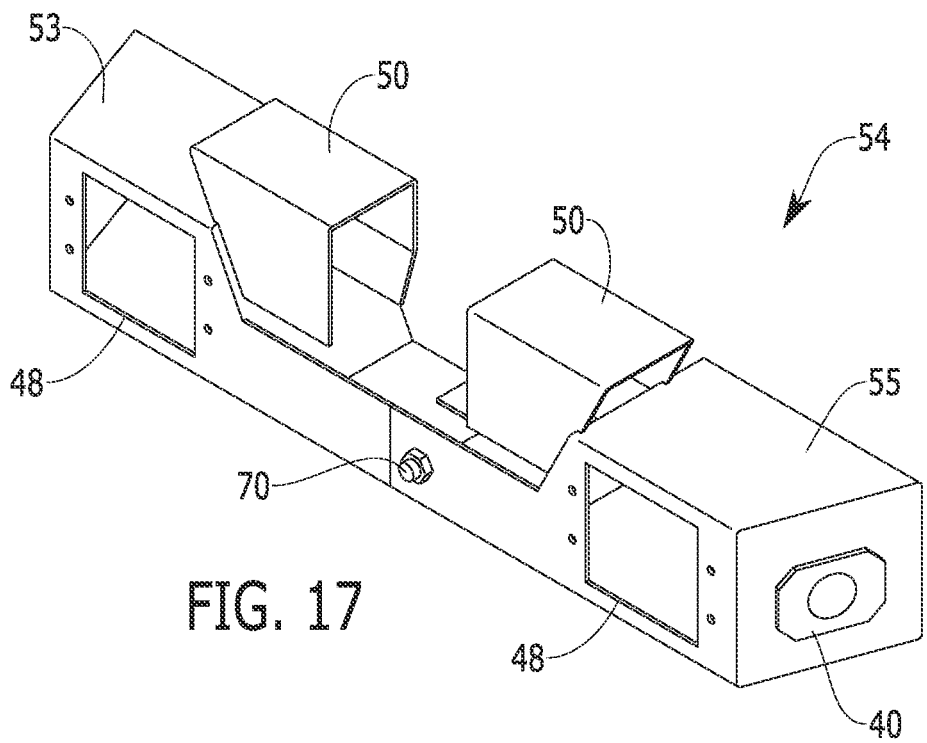
FIG. 17 is a top front perspective view of an exemplary embodiment of the present invention.
Figure 18:
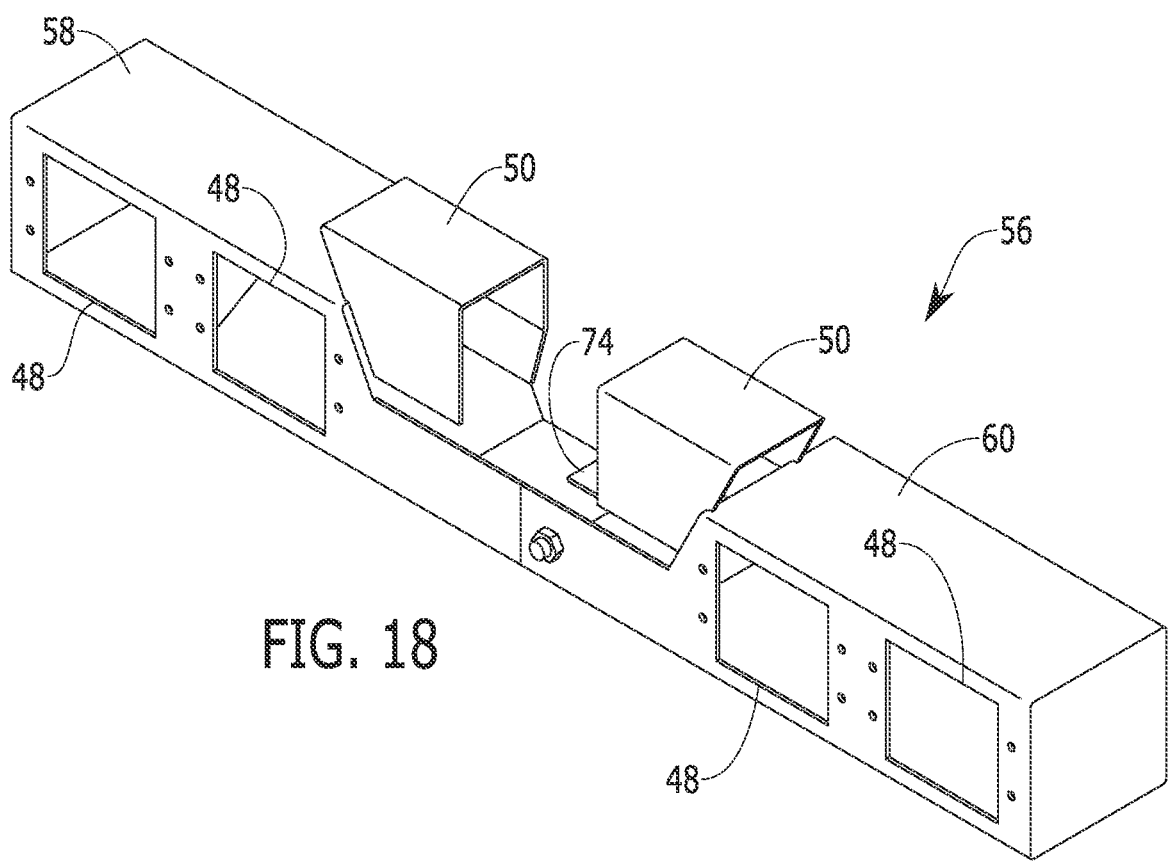
FIG. 18 is a top front perspective view of an exemplary embodiment of the present invention.

As illustrated in FIGS. 17 and 18, the receiver halves 53, 55 and 58,60 of a hitch receiver 54 or 56, may provide a distal end face providing an auxiliary light 40 and/or may provide two cutouts 48 along each half 58, 60.

Figure 19:
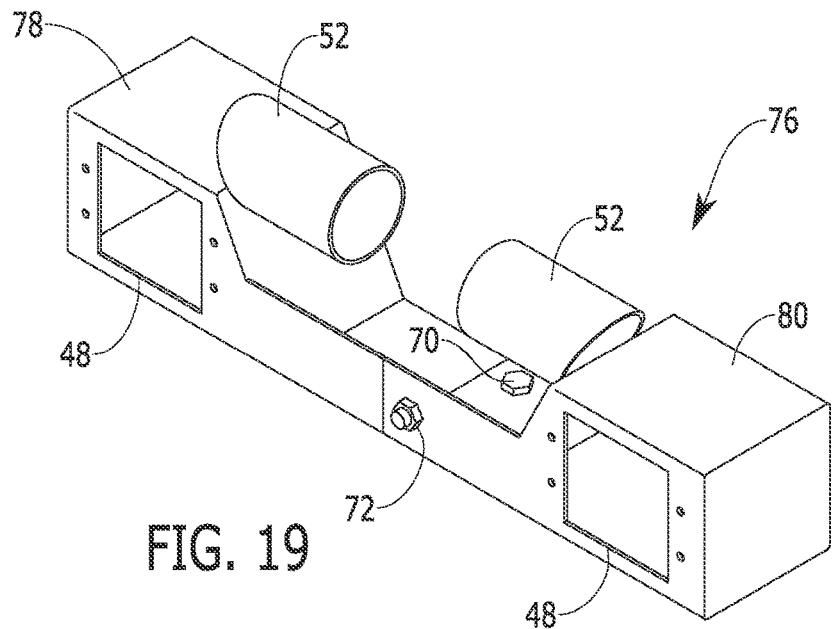
FIG. 19 is a top front perspective view of an exemplary embodiment of the present invention.
Figure 20:
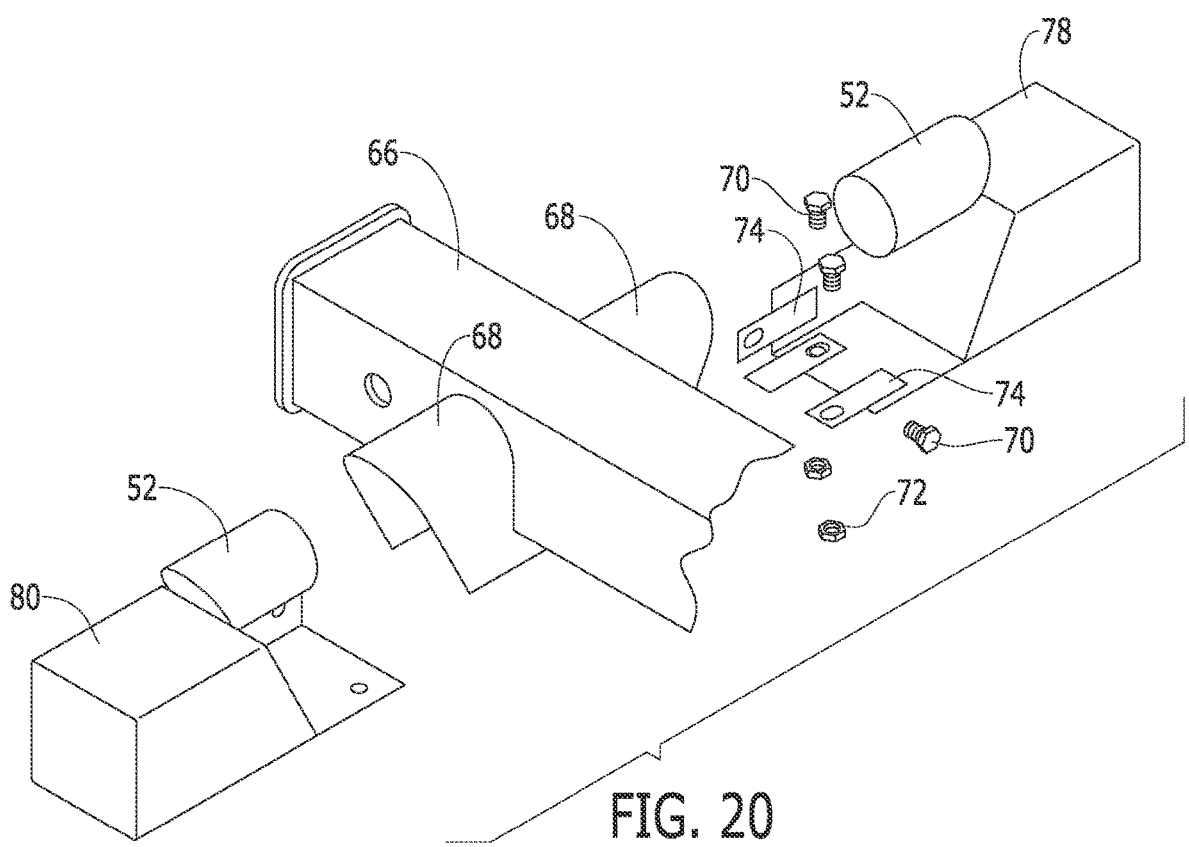
FIG. 20 is a rear front perspective view of an exemplary embodiment of the present invention, shown in use installed to a hitch 66.

As illustrated in FIGS. 19 and 20, the halves 78, 80 of the hitch receiver 76 may provide curved or rounded posts 52 that are slidably received by rounded hitch wings 68.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the present invention.

What is claimed is:

1. An auxiliary light system for a vehicle with a hitch receiver, the auxiliary light system comprising:
   a two-part assembly having a saddle shaped:
      each part of the two-part assembly having an inclined wall inward of a distal end, wherein the inclined wall defines a half of the saddle shape;
      the distal end providing an enclosure;
      at least one cutout formed along a longitudinal side of the enclosure; and
      extending proximally from each inclined wall, is a first channel; and
   a second channel attached on each of two opposing lateral sides of a hitch receiver, wherein the second channel has three closed sides and an open side receive a respective first channel through the open side in a nested condition,
   wherein the two-part assembly is oriented approximately perpendicular relative to the hitch receiver when the hitch receiver is seated in the saddle shape.

2. The auxiliary light system of claim 1, wherein one or more auxiliary lights are encapsulated in each distal end.

3. The auxiliary light system of claim 2, further comprising an end auxiliary light along the distal end so as to be oriented approximately perpendicular to the one or more auxiliary lights.

4. The auxiliary light system of claim 2, wherein the second channels are rounded.

5. The auxiliary light assembly of claim 1, further comprising one or more fastening plates connected to a first part of the two-part assembly so as to protrude from the first part to connect to a second part of the two-part assembly.

* * * * *